Sept. 2, 1958 H. R. NILSSON 2,849,988
ROTARY DEVICES AND CASING STRUCTURES THEREFOR
Filed Oct. 26, 1954 6 Sheets-Sheet 1

Sept. 2, 1958 H. R. NILSSON 2,849,988
ROTARY DEVICES AND CASING STRUCTURES THEREFOR
Filed Oct. 26, 1954 6 Sheets-Sheet 2

INVENTOR.
BY

Sept. 2, 1958  H. R. NILSSON  2,849,988
ROTARY DEVICES AND CASING STRUCTURES THEREFOR
Filed Oct. 26, 1954  6 Sheets-Sheet 3

INVENTOR.
Hans Robert Nilsson
BY
His Attorney

Sept. 2, 1958 H. R. NILSSON 2,849,988
ROTARY DEVICES AND CASING STRUCTURES THEREFOR
Filed Oct. 26, 1954 6 Sheets-Sheet 4

INVENTOR.
Hans Robert Nilsson
BY
his Attorney

Sept. 2, 1958   H. R. NILSSON   2,849,988
ROTARY DEVICES AND CASING STRUCTURES THEREFOR
Filed Oct. 26, 1954   6 Sheets-Sheet 5

INVENTOR.
Hans Robert Nilsson
BY
James C. Markle
His Attorney

Sept. 2, 1958   H. R. NILSSON   2,849,988
ROTARY DEVICES AND CASING STRUCTURES THEREFOR
Filed Oct. 26, 1954   6 Sheets-Sheet 6

INVENTOR
Hans Robert Nilsson
BY
his Attorney

United States Patent Office 2,849,988
Patented Sept. 2, 1958

2,849,988

ROTARY DEVICES AND CASING STRUCTURES THEREFOR

Hans Robert Nilsson, Ektorp, Sweden, assignor, by mesne assignments, to Svenska Rotor Maskiner Aktiebolag, Nacka, Sweden, a corporation of Sweden Application October 26, 1954, Serial No. 464,688

22 Claims. (Cl. 121—70)

The present invention relates to a rotary device of the kind providing working spaces or chambers between intermeshing rotors of the screw wheel type. Such devices may be employed as compressors to compress a gaseous fluid, or as disclosed in the U. S. Patents Nos. 2,627,161 and 2,627,162 granted to T. I. Lindhagen and H. R. Nilsson, as engines generating power by the expansion of such fluid. More particularly, the invention relates to a casing structure for such device, having at least two intersecting bores for a corresponding number of parallel rotors provided with intermeshing helical lobes and grooves and mounted to rotate in said bores.

The compressed motive medium, such as gas utilized in rotary expanders of the kind under consideration, has usually an initial temperature of very high order, for instance up to 2000° F. or more, and therefore, the working surfaces of the machine structure subjected to hot motive medium must be cooled effectively and uniformly in order to avoid heat distortion and to maintain the temperature of material below the limit permitted with respect to material stress.

According to a known construction the external surface of the casing is provided with annular grooves which are covered by an outer jacket, said grooves providing channels for a cooling medium to circulate therein. Due to the character of design, the thickness of the walls of this casing has necessarily been relatively great, resulting in a high temperature drop between the inner surface exposed to the hot motive fluid and the outer surface of the casing subjected to the temperature of the cooling medium and, consequently, heat distortion and all deficiencies related thereto become a major problem in such constructions.

One object of the invention is, therefore, to provide a new casing having a cooling jacket enabling a more effective and uniform cooling. The invention has for its object to provide a double-walled casing structure having a cooling jacket space between its walls, in which casing structure the inner one of said walls is relatively thin in order to promote an effective and uniform cooling of the inner and outer walls of the casing structure and further to provide said casing structure with reinforcement means so that the inner wall still is able to withstand high pressure differences between the working chambers of the rotary device and the cooling jacket space thereof.

Another object of the invention is to provide a casing structure comprising an inner lining and an outer housing supporting said lining, the inner lining comprising portions enveloping the corresponding rotor sections and consisting of a material too thin and therefore insufficient in strength to withstand the pressure conditions prevailing during operation of the device and the outer housing providing means to maintain the inner lining undeformed in its original shape.

Another object of the invention is to provide an improved circulation system for the cooling medium to enable an effective and uniform cooling of the inner and outer walls of the casing structure and of the rotors enclosed therein.

Still another object of the invention is to provide a circulation system of the working medium, the flow direction of which is generally parallel with the flow of the working medium through the rotary device in order to equalize the temperature differences between the high and the low temperature ends of the rotary device.

A further object of the invention is to provide a casing structure for a rotary device which permits relative expansions of different parts of the rotary device in its entirety due to temperature differences during the operation of the device without warping of the casing as a whole and without derangement of the close running fit between the different parts constituting the same in order to reduce the operating losses and prevent every form of seizing.

A still further object of the invention is to provide a casing structure in which only the parts thereof exposed to the highest temperature are made of a high temperature and wear resistant material such as special steels having the mentioned qualities and, further, being resistant to scaling due to oxidizing and which may be comparatively expensive while the rest of the casing can be made of a cheaper and less resistant material, such as iron plate.

A still further object of the invention is to provide a casing structure of considerably reduced weight but yet stable and not affecting the performance of the rotary device.

According to the invention the new casing structure comprises an inner lining and an outer housing supporting said lining, the inner lining comprising intersecting barrel portions enveloping the corresponding rotors and provided with spaced external projections to reinforce the same and to increase its cooling surface, the outer housing surrounding the lining and being provided with spaced internal projections exceeding the lining projections in height and acting as supporting means for the lining, and said inner lining and said outer housing defining a cooling space therebetween for flow of a cooling medium therethrough.

In the following, these and other objects of the invention and the advantages thereof will be described more in detail with reference to the annexed drawings which by way of example, though without restricting the invention to same, show some preferred embodiments.

Figure 1:
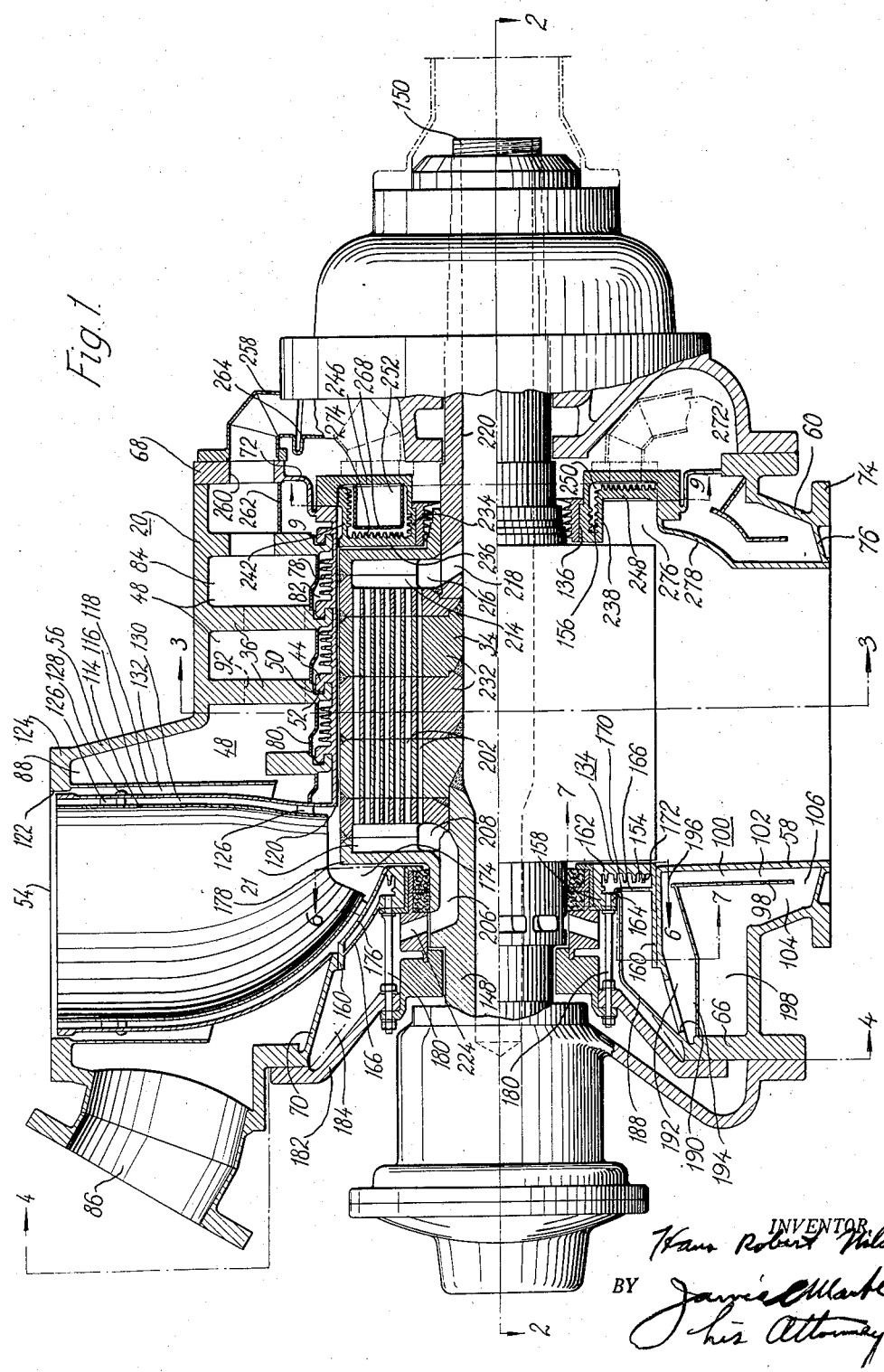
Fig. 1 is a vertical longitudinal section taken on line 1—1 of Figs. 2, 3, 6 and 9 of a rotary screw wheel engine according to the invention.
Figure 2:
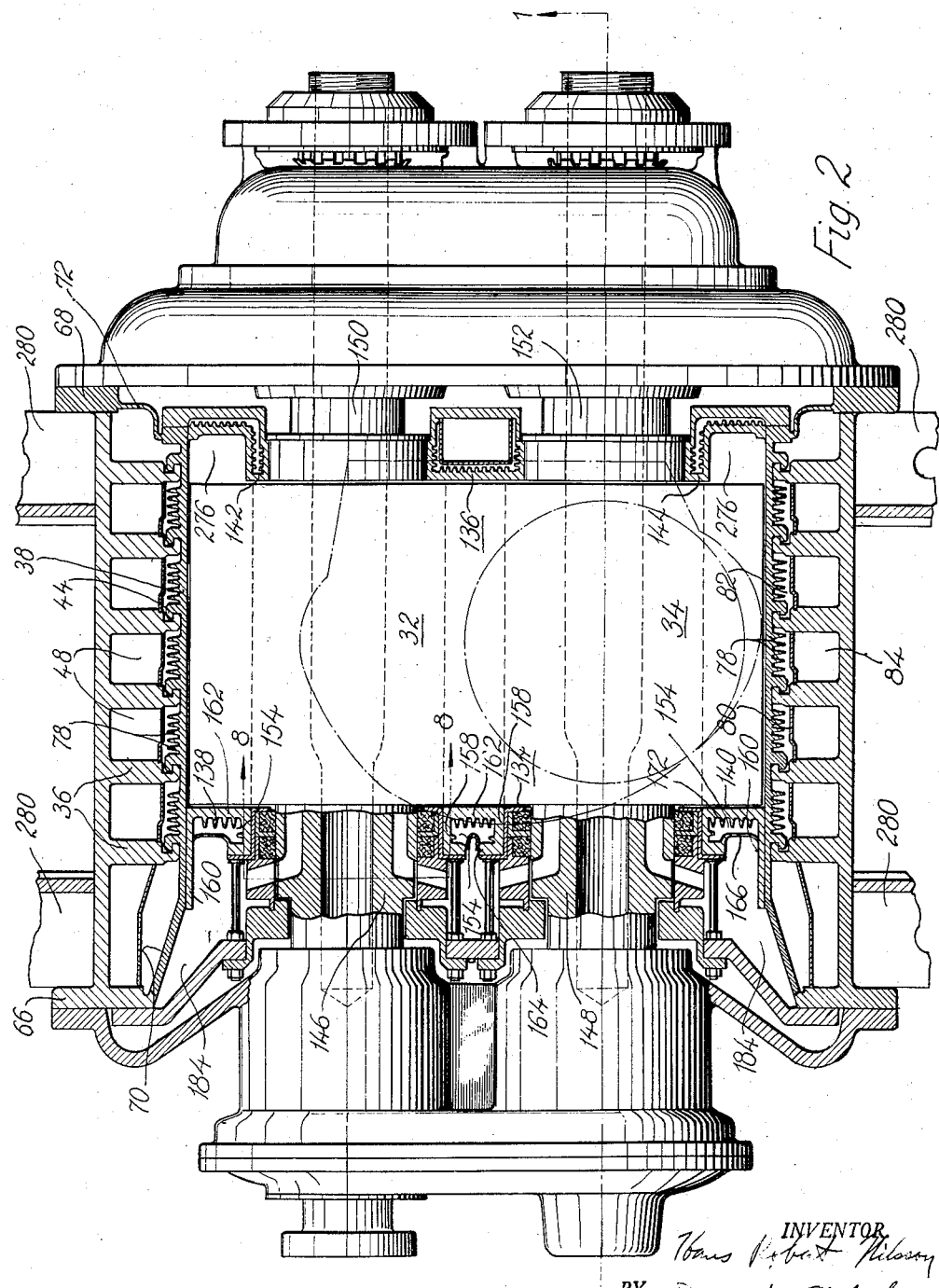
Fig. 2 is a horizontal longitudinal section of the rotary device taken on the line 2—2 of Figs. 1 and 3.

The rotary device chosen as an example consists of a positive displacement rotary power engine generally designed according to the same principles as are characteristic of the engine type described in the U. S. patents referred to above and to which reference may be had for a more detailed disclosure of the specific structure thereof and the manner in which the operation of the engine is to be carried out.

The casing structure for the rotary device which operates as an expander of a high pressure and high temperature working medium has an outer housing 20 comprising two mainly half-cylindrical jacket portions 22, 24 united by a further curved jacket portion 26 at their upper ends so that they provide two intersecting bores 28, 30 for a male and a female rotor, the body portions of said rotors being denoted 32 and 34, respectively. The rotors are in a manner known per se provided with intermeshing helical lobes and grooves and mounted to rotate in said bores 28, 30.

The bores 28, 30 are provided with internal projections consisting of annularly disposed fins 36 evenly distributed along the inside of the bores and so arranged that the fins in one of the bores at the top portion of the casing structure pass over into the corresponding fins in the other bore, said annular fins 36 serving as supporting and reinforcing means for a thin-walled inner lining 38 comprising two barrel portions 40, 42, respectively, for each of the bores 28, 30 formed to envelop the corresponding rotors in respective bore. The barrel portions 40, 42 of the inner lining are provided with annularly disposed external projections or fins 44 which are in engagement with the annular fins 36 on the inside surface of the bores 28, 30 of the outer housing 20. It is evident that the engaging fins 36 and 44 divide the annular space 46 between the inner lining and the outer housing in a number of axially distributed space sections 48 along the rotors. The fins 36 of the outer housing 20 are further provided each with a lateral groove 50 and the fins 44 of the barrel portions 40, 42 of the inner lining 38 are each provided with a laterally protruding tongue portion 52 (Fig. 1) in keying engagement with the respective groove 50 receiving the tongue. The finger portions thus provided on the lining and housing fins interlock each other in a locked-finger manner in one and the same direction so that an axial dilatation of the inner lining 38 in relation to the outer housing 20 is permitted.

The barrel portions 40, 42 are inserted separately in the respective bores and turned to seat keyed by the fins 36, 44 engaging each other. When the barrel portions are seated the edges meeting each other at the top of intersection of the barrel portions are united by a weld.

The casing structure has a generally radially extending inlet funnel 54 for a high pressure and high temperature working medium, for instance produced and delivered according to the principles set forth in the patents cited above. Said working medium inlet funnel 54 discharges into an opening of the inner lining 38 located at one end of the rotors—the high pressure end—in the upper intersection between the inner lining barrel portions 40, 42. The inlet funnel 54 is surrounded by an enclosing extension 56 of the outer housing 20 of generally frusto-conical shape tapering upwardly.

The barrel portions 40, 42 of the inner lining pass over at the bottom part of the casing structure into a radially extending tubular duct 58 serving as an outlet for the working medium of a generally frusto-conical shape tapering outwardly and the outer housing is provided with a corresponding radial extension 60 generally following the shape of the duct 58 which the inner lining provides.

In the illustrated embodiment the male rotor 32 is provided with four lobes 62 and the female rotor 34 with six lobes 64 but, of course, the lobe number can be varied. In the present case, however, the male rotor by means of which the female rotor is driven, will rotate with a speed that is 50% higher than that of the female rotor and discharge the working medium from the chambers defined by its groove portions with a correspondingly higher velocity than the female rotor grooves. In order to smooth out the differences in velocities the working medium outlet, therefore, is inclined toward the female rotor side with its centre tending to lie along the resultant to the two velocity components as far as the constructional possibilities permit.

To the ends of the outer housing 20 flanges 66, 68 are attached for instance by welding. The ends of the barrel portions 40, 42 of the inner lining are united to these flanges via transition members 70 and 72 of which especially the transition member 72 at the low pressure end of the engine is given a certain flexible diaphragm character to permit the inner lining 38 to expand toward the low pressure end of the engine in relation to the outer housing 20. The grooves 50 of the fins 36 in the outer housing receiving the tongues 52 of the fins 44 on the inner lining open also toward said low pressure end of the engine to enable said relative expansion.

The extension 60 of the outer housing which surrounds the duct 58 formed by an extension of the inner lining to provide an outlet for the working medium has an end flange 74 to which the outer end of the lining extension 58 is attached via a transition member 76 of slightly flexible diaphragm character.

The outer surfaces of the barrel portions 40, 42 are provided with external projections in the form of annularly disposed fins 78 evenly distributed along the interspaces between the fins 44 of the inner lining which key with the supporting fins 36 in the outer housing, said projections serving as cooling means to increase the cooling surface of the lining. The annular partition fins 44 as well as the cooling fins 78 also function as reinforcing means so that the inner lining 38 can be made rather thin-walled to promote the efficiency of the cooling but yet able to withstand high pressure differences. In order to enable an effective and uniform cooling of the inner lining a sufficient number of cooling fins of sufficient height are arranged to provide a high area ratio between the outer and the inner surfaces of the lining. These cooling fins 78 of the inner lining are proportionally much lower in height than the suppporting fins 36 in the outer housing to provide a cooling space outside the cooling fins 78 of the lining, and adjacent the tops of the cooling fins 78 of the inner lining a partion wall member 80 is inserted between each pair of adjacent supporting fins 36 of the outer housing and attached thereto for instance by means of welding. The partition walls 80 follow the curvature of the barrel portions of the inner lining and divide each of the annular jacket space sections 48 between the outer housing and the inner lining into an inner and an outer jacket space subsection 82, 84, which space subsections are utilized for flow of a cooling medium. The partition walls 80 are preferably located in immediate proximity to the ends of the cooling fins 78 so that the free gap therebetween is minute in relation to the height of the cooling fins in order to increase the speed of the cooling medium flow and to counteract the creation of insulating boundary layers on the surface of the cooling fins.

The cooling medium is introduced through a cooling medium inlet 86 provided on the extension 56 of the outer housing surrounding the working medium inlet funnel 54 and discharging into a cooling space 88 between the funnel 54 and the frusto-conical part 56 of the outer housing which cooling space simultaneously serves as a distribution chamber to supply cooling medium in a number of parallel flows thereof to different cooling spaces arranged in the parts constituting the rotary engine.

Figure 3:
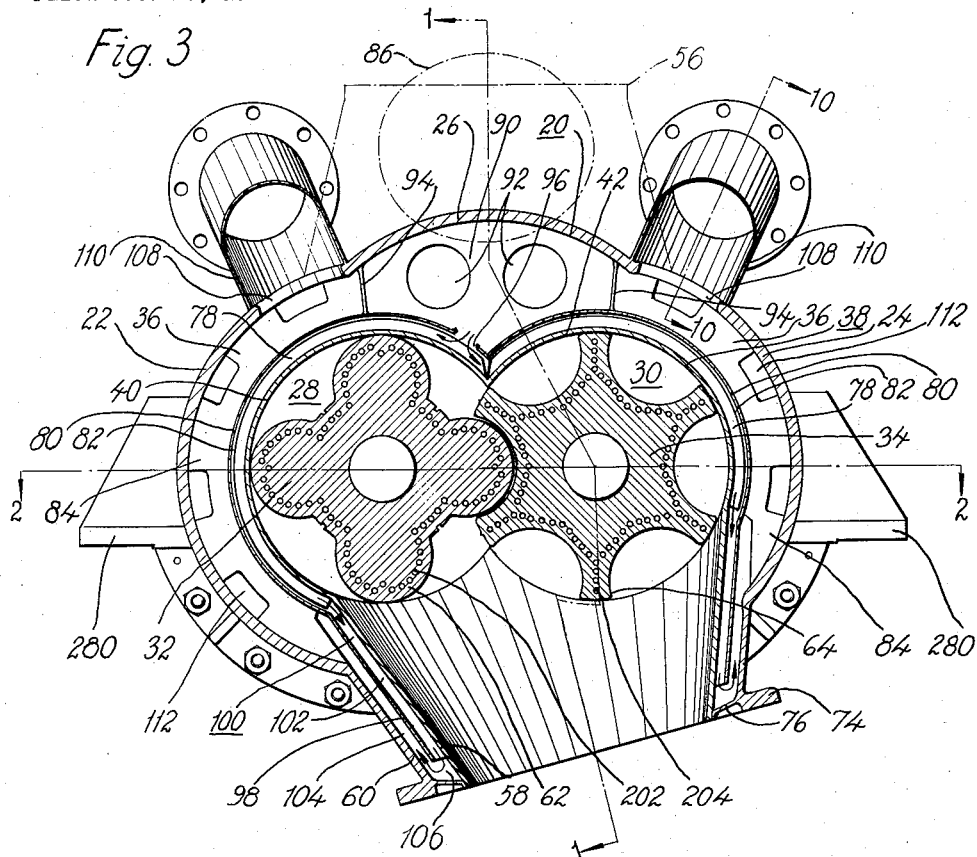
Fig. 3 is a transverse section of the rotary device taken on the line 3—3 of Fig. 1.
Figure 9:
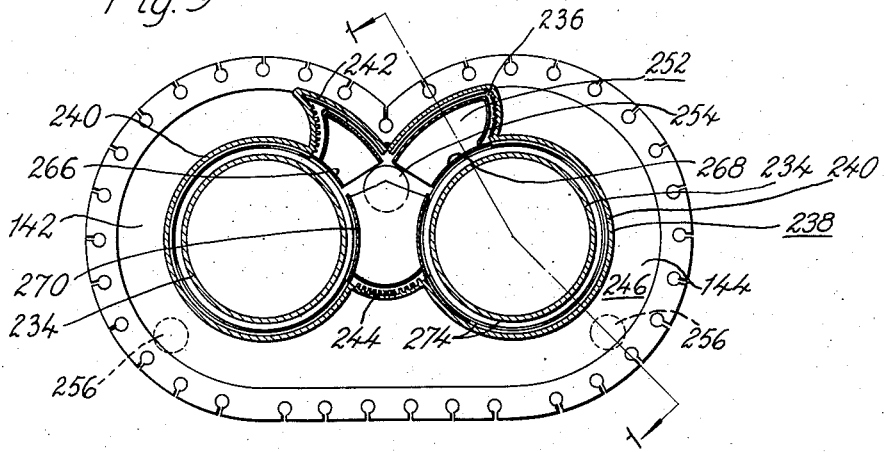
Fig. 9 is a sectional view of the low pressure end of the rotary device taken on the line 9—9 of Fig. 1.
Figure 4:
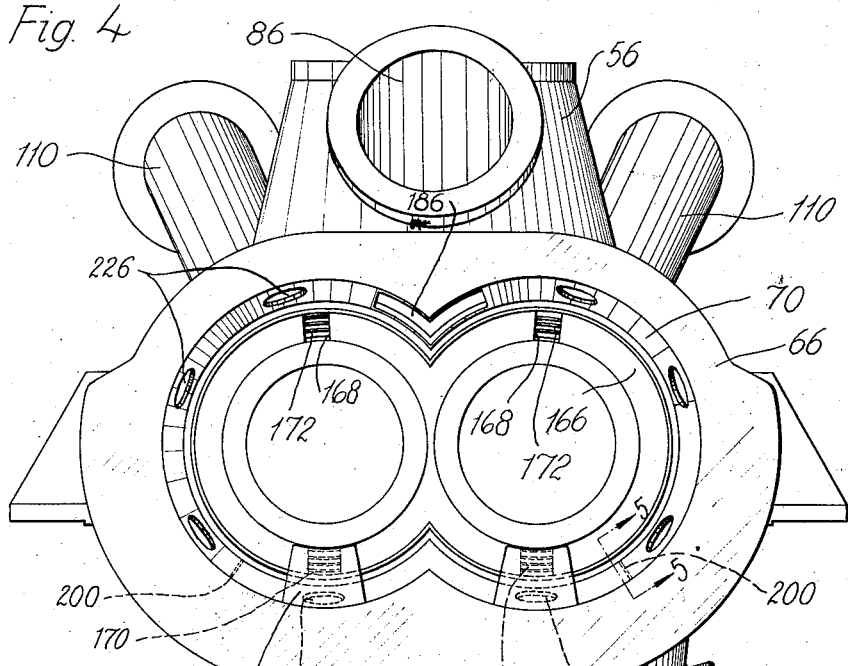
Fig. 4 is a view of the high pressure end of the rotary device taken on the projection 4—4 of Fig. 1.
Figure 5:
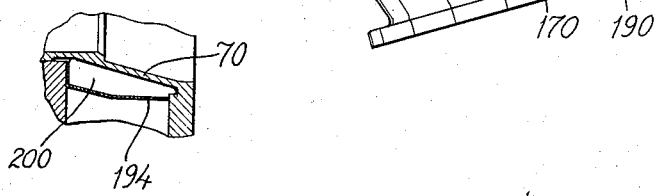
Fig. 5 is a sectional detail view taken on the line 5—5 of Fig. 4.
Figure 6:
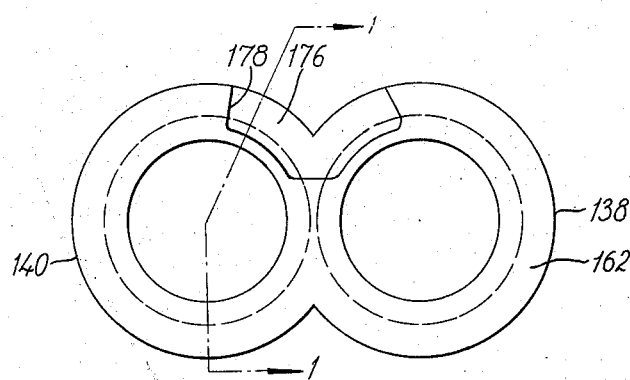
Fig. 6 is a detail end view taken on the projection 6—6 of Fig. 1.
Figure 7:
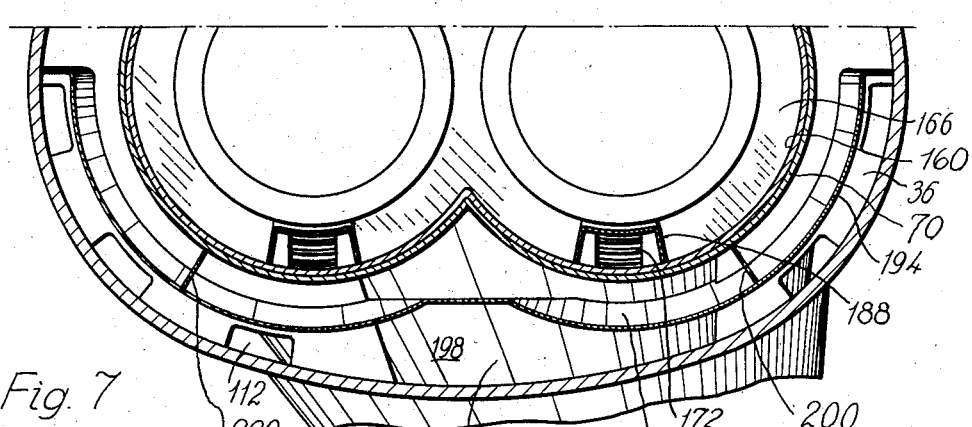
Fig. 7 is a sectional detail view taken on the line 7—7 of Fig. 1.
Figure 8:
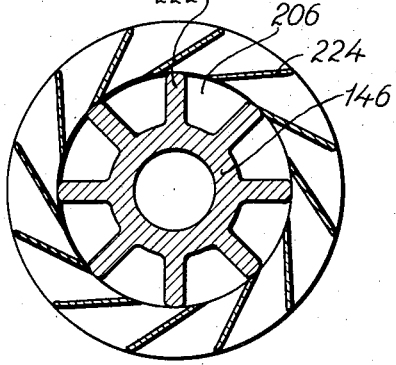
Fig. 8 is a detail end view taken on the projection 8—8 of Fig. 2.
Figure 10:
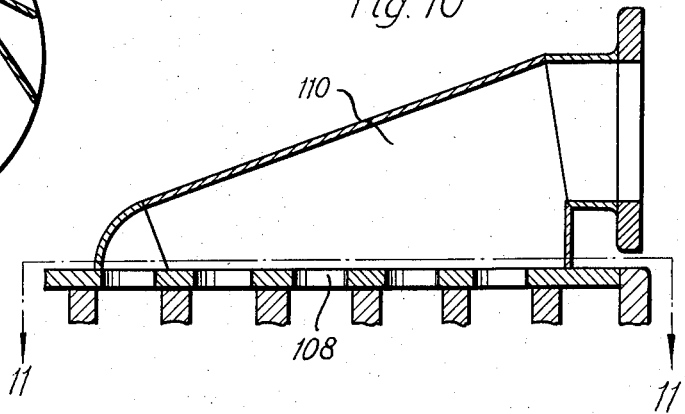
Fig. 10 is a sectional detail view of a cooling medium outlet duct taken on the line 10—10 of Fig. 3.
Figure 11:
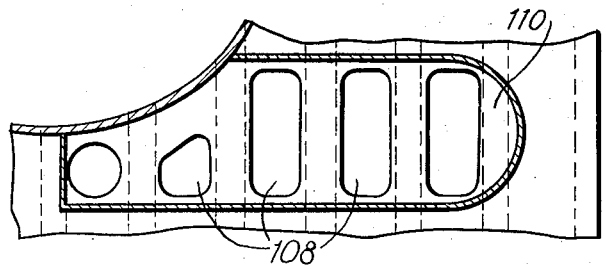
Fig. 11 is a sectional detail view taken on the line 11—11 of Fig. 10.
Figure 12:
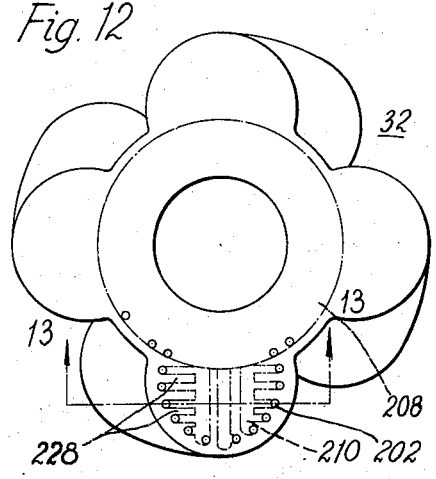
Fig. 12 is an end view of a male rotor section.
Figure 14:
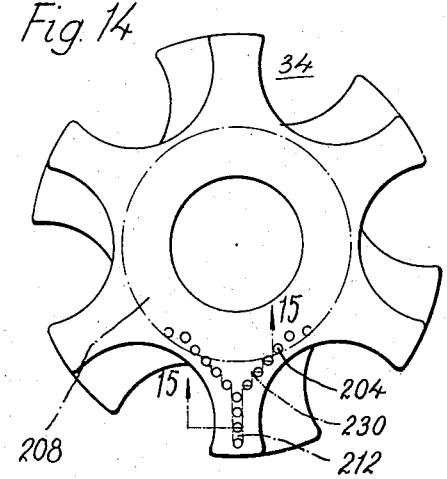
Figs. 14 and 15 are similar views of a female rotor section.
Figure 13:
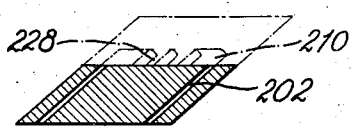
Fig. 13 is a sectional detail view taken on the line 13—13 of Fig. 12.
Figure 15:

The top portions 90 (Fig. 3) of the outer subsections 84 of the cooling jacket space sections 48 are in direct communication with each other and with the distribution chamber 88 of the cooling medium through openings 92 in the internal fins 36 of the outer housing. Said top portions 90 are separated by means of axially extending vertical walls 94 from the remaining portions of the outer subsections 84. On the male rotor side, preferably, in relation to the intersection between the cylindrical wall segments which the partition walls 80 consist of, apertures 96 are provided in the partition walls so that the cooling medium can enter the inner cooling space subsections 82 through which it flows divided in two flows, one encircling the inner space subsections surrounding the male rotor and the other the inner space subsections surrounding the female rotor. By displacing the apertures 96 toward the male rotor side the difference in length of the respective halves of the space subsections 82 is compensated.

The partition walls 80 pass over into a generally tubular partition wall 98 surrounding the inner lining extension 58 which forms the outlet duct for the working medium and divides the space 100 between the inner lining extension 58 and the outer housing extension 60 at the working medium outlet into an inner and an outer cooling space section 102 and 104, respectively. The lower end of the partition wall 98 ends at a distance above the transition 76 between the outer ends of the lining and housing extensions 58 and 60 to provide an overpass opening 106 between the inner and outer space sections 102 and 104. The cooling medium flowing downwardly in the inner cooling space subsections 82 around the barrel portions of the inner lining discharges into the inner cooling space section 102 surrounding the working medium outlet 58, enters through the overpass 106 into the outer cooling space 104 around the working medium outlet and having passed therethrough enters the different outer cooling space subsections 84 from which the partial flows are discharged through openings 108 in the outer housing into two outlet ducts 110 for the cooling medium. The outer cooling space subsections 84 communicate also with each other laterally from subsection to subsection by means of recesses 112 made on the peripheral edges of the fins 36 of the outer housing for this purpose and further to reduce the total weight of the construction.

The working medium inlet 54 consists of three funnel portions 114, 116 and 118 placed within each other. Of these funnels the intermediate one 116 is welded to the working medium inlet opening 120 in the inner lining 38 and its upper end is permitted to move freely in the opening 122 of the inlet connecting flange 124. The innermost funnel 114 is separated from the intermediate funnel 116 by means of an upper and a lower ring of lugs 126 fastened to the inner funnel 114 so that the inner funnel is free to expand and contract in relation to the intermediate funnel 116. A ring of rivets 128 on the intermediate funnel 116 may further be provided to carry the inner funnel 114 by engaging its upper ring of lugs. The supplying duct for the working medium is to be fastened to the flange 124 of the inlet and has conveniently a guide border inserted in the upper end of the inner funnel 114. To the space 130 between the inner and intermediate funnels 114, 116 for instance air of appropriate high pressure and temperature but below those of the working medium is introduced to protect the inner funnel from destruction by scaling and similar damages, said protecting agent being mixed with the working medium when it enters the working chambers of the rotors. The outermost of the funnels 118 is attached to the flange 124 and the space 132 between said outer funnel 118 and the intermediate one 116 is supplied with cooling medium from the chamber 88 for distribution of the cooling medium which is provided around the working medium inlet 54. Passages may be provided to let the cooling medium in the space 132 between the outer and the intermediate funnel pass over into the space 130 between the intermediate and the inner funnels.

The rotary device further comprises front walls 134 and 136, respectively, facing the ends of the body portions 32, 34 of the rotors which front walls each consist of intersecting ring portions 138, 140 and 142, 144, respectively, surrounding the shaft portions 146, 148 and 150, 152 of the rotors to close the ends of the grooves of the rotors. The front walls are each provided with an internal space 154 and 156, respectively, for a cooling medium.

The front wall 134 covering the high pressure end of the rotors comprises an inner and an outer sleeve member 158 and 160, respectively, of generally 8-shaped cross sections united together at their ends facing the rotors by means of a disc 162 cut out in 8-shape. The inner sleeve member 158 has an external flange 164 at its end remote from the rotor ends and a plate disc 166 unites the flange with the corresponding end of the outer sleeve member 160. In the 8-shaped annular space 154 thus provided inside the front wall 134 cooling medium is introduced at top portions thereof through apertures 168 in the plate disc 166 and the cooling medium is discharged through similar apertures 170 in bottom parts of the plate disc 166. The cooling medium side surfaces of the inner sleeve member 158 and the disc 162 are provided with cooling fins 172 and the general design of these cooling fins follows the principles set forth above as regards the cooling fins on the inner lining to obtain a high area ratio between the heat exchanging surfaces and to counteract creation of insulating boundary layers.

An important detail in the design of the front wall 134 at the high pressure end is that the same provides a conduit groove 174 for the working medium to the working chambers of the rotors at the top intersection portion of the casing structure. The inlet groove 174 consists of a recessed portion 176 in communication with the inlet funnel 54 for the working medium and faces a circumferentially restricted portion 178 of the ends of the rotors. The front wall 134 is fastened to the inner lining of the housing by a weld between the inner lining 38 and the outer sleeve member 160 of the front wall and further by means of pin bolts 180 anchored in the inner sleeve member 158 of the front wall and in a lid ring 182, the latter in its turn being bolted to the flange 66 of the casing structure.

The cooling medium is supplied to the cooling space 154 of the front wall 134 from the chamber 88 for distribution of the cooling medium and finally discharged into the cooling space 100 provided around the working medium outlet in the following manner. The lid ring 182, the front wall 134 and the transition member 70 defines an 8-shaped annular space 184 around the rotor shafts 146, 148 at the inlet end of the engine and the cooling medium enters said space through an opening 186 located at the upper intersection between the two annular portions forming the transition member 70. From this space 184 the cooling medium is supplied to the cooling space 154 of the front wall 134 through the aperture 168 and discharged therefrom through the apertures 170 into ducts 188 separating these outlets 170 from the space 184 and conveying the discharged cooling medium to apertures 190 provided in the transition member 70 adjacent said outlets 170. Through said apertures the cooling medium is discharged into the space 192 provided between the lower part of the transition member 70 and a plate 194 following the curvature of the transition member generally conformably up to the horizontal plane of symmetry of the casing structure where the plate 194 is fastened to the inner surface of the outer housing. Said space 192 is in communication with the inner cooling space 102 around the working medium outlet through the opening 196 between the partition wall 98 in the cooling space 100 and the adjacent part of the transition member 70. As the cooling space 100 communicates with the two outlet ducts 110 for the cooling medium encircling within the cooling jacket of the casing structure it is evident that the cooling medium flow through the front wall 134 is parallel to that through the casing structure.

The space 198 below the plate 194 communicates through the recesses 112 in the adjacent fin 36 of the outer housing with the several annular cooling spaces 48 of the casing structure. To prevent the cooling medium to bypassing the cooling space 154 of the front wall 134 the space 192 by means of two radial walls 200 is shut off from direct communication with the space 184 around the rotor shafts 146, 148.

In order to promote a further effective cooling of the engine for the purposes disclosed in the patents referred to above, the rotor bodies 32, 34 are provided with cooling passages 202 and 204, respectively, adjacent the surfaces thereof. The surfaces of the rotor shafts 146, 148 are provided with a number of peripherally spaced grooves 206 in communication at one end with the space 184 around said rotor shafts and at the other end in communication with an annular distribution groove 208 at the high pressure end of the rotor bodies 32, 34. From said groove 208 radial ducts 210 and 212, respectively, in the rotor bodies 32, 34 distribute the cooling medium to the passages 202, 204 therefor in the rotor bodies and the cooling medium is discharged from the passages 202, 204 at the low pressure end of the rotor bodies into radial ducts 214 which convey the cooling medium to an annular groove 216 facing outlet openings 218 provided in the rotor shafts 150, 152. The rotor shafts 150, 152 are hollow and so are also the centre portions of the rotor bodies 32, 34 and the adjacent portions of the rotor shafts 146, 148 on the high pressure side. The cooling medium discharged into the central bores 220 of the rotor devices escapes through the open ends of the rotor shafts 150, 152.

The cooling medium from the space 184 is propelled into the rotor cooling passages by means of the rib portions 222 left between the grooves 206 on the rotor shafts 146, 148, said ribs acting as vanes to move the cooling medium. In order to increase the efficiency at the intake a guide blading 224 is provided at the intake of the grooves 206. A comparatively large amount of the available cooling medium is forced through the cooling passages of the rotors, so that extra inlet apertures 226 are provided in the transition member 70 besides the main inlet 186 to keep the space 184, which delivers the cooling medium to the rotors, amply supplied with said agent.

In order to cool the ends of the rotor bodies with increased efficiency the radial ducts 210, 214 and 212, respectively, conveying the cooling medium to and from the cooling passages in the rotor bodies are cut in such a manner that they leave a series of cooling fins 228 and 230, respectively, on the inside surfaces of these ducts 210, 214 and 212, respectively, conveying cooling medium, said fins 228 and 230 enabling the rotor ends to withstand high pressure differences without distortion even though they are made relatively thin-shelled by the scooping-out. The rotor bodies 32, 34 consist of a number of sections 232 fastened together by means of for instance welding. Said sections are easy to drill for providing the generally helically running cooling passages 202, 204 of the rotor bodies, each passage portion of the rotor body section being produced by drilling the section from one side thereof to about the half of its depth and then from the other side thereof until the taps meet.

The front wall 136 at the low pressure end of the rotors comprises two cylindrical inner sleeve members 234 surrounding the rotor shafts 150, 152 to which sleeve member a disc 236 is welded at the edge thereof which is adjacent the rotor ends, said disc partially closing the outlet ends of the rotor grooves at a top portion of the intersection therebetween and extending downwardly a little below the middle of the space between said sleeves 234. An outer sleeve member 238 is further provided which has two cylindrical portions 240 following the contour of the inner sleeves 234 until they meet the closing disc 236 where they change into upper and lower portions 242 and 244 following the border contour of this disc to frame the same. A disc 246 cut out generally in 8-shape is fastened directly to the outer sleeve member 238 at the outer edges of the upper and lower portions 242, 244 thereof, the length of said outer sleeve member 238 being shorter along the cylindrical portions 240 thereof. To the outer edges of said shortened portions 240 a disc 248 of partial 8-shape is fastened which at its circumference is fastened to the disc 246. The front wall 136 in this way has an inner cooling space 156 comprising in cross section an annular L-shaped portion 250 and a mainly rectangular portion 252 in the latter of which an inlet opening 254 and in the first of which two outlet openings 256 for the cooling medium are provided. The inlet opening 254 is connected by means of a piping 258 with an opening 260 in the end flange 68 of the casing structure, said latter opening being in communication with the top portions 88 of the cooling jacket space of the casing structure which as mentioned above is supplied with cooling medium directly from the main cooling medium inlet. In the section of the space between the lining 38 and the housing 20 adjacent the opening 260 in the end flange a separating plate 262 is inserted to convey the cooling medium from the portion 88 to the opening 260. As the front wall 136 by means of the disc 246 is bolted to the end of the lining 38 the piping 258 is provided with a couple of expansion joints 264 to take up the thermal expansion movements of the lining 38 in relation to the outer housing 20. The portion 252 of the cooling space 156 of the front wall 136 serves as a distribution means for the supplied cooling medium so that it is distributed to the different cooling passages of the front wall. Said means consists of three appropriately curved U-profiles 266, 268 and 270 fastened to the inside of the disc 246 by means of their longitudinal edges, said profiles meeting adjacent the inlet opening 254 with their open ends while the ends remote from said opening are closed. Between said profiles and around them passages for distribution of the cooling medium are obtained, said passages also bringing about efficient cooling of adjacent parts of the front wall 136. The leaving cooling medium is discharged through a bifurcated piping 272 the prongs of which are provided with expansion joints and connected to respective openings 256. The sleeve and disc members 234, 238 and 236, 248, respectively, are provided with internal cooling fins 274 to increase the cooling surfaces thereof, the design of said cooling fins following the principles disclosed above as regards the cooling fins of the inner lining. It is evident that also the flow of cooling medium through the front wall 136 at the low pressure end is parallel to the cooling medium flows through the casing cooling jacket, the rotors and the front wall 134 at the high pressure end. In respective outlet arrangements of these different flow paths dampers or similar means can be provided to regulate the distribution of the cooling medium into the different paths.

By means of the L-shaped portion of the front wall 136 an axial outlet 276 of partially double-annular form is provided for the working medium leaving the low pressure ends of the rotor grooves. The inner lining extension 58 defining the working medium outlet duct has a recessed portion 278 for conveyance of working medium discharged in said outlet ring 276 to the outlet 58 for the working medium.

The casing structure is provided with four brackets 280 to support the same upon a suitable bed. Said brackets 280 are located a little below the horizontal plane through the rotor axes to reduce the raising of the rotor axes due to the heating up of the engine in comparison with such a device rested, as is otherwise usual, upon the end of the outlet. In accordance with a preferred arrangement, the engine directly drives the compressor which delivers the cooling medium for the casing structure. The height of the compressor axes above their bed is made sufficiently great in comparison with the height of the rotor axes of the engine above their bed as the compressor is heated up much less than the rotary engine, and chosen so that the resultant raising is the same in both cases.

Significant for the new casing structure is that it comprises a stable outer supporting housing which is not directly exposed to the hot working medium but instead is on its inner surface in contact with the cooling medium and on its outer surface with the ambient atmosphere.

The inner lining is permitted to expand axially when the rotors of the engine expand and the close fit between the rotor ends and the closing members confronting the same is maintained due to the arrangement permitting relative motion between the inner lining and the outer housing and the flexible joint between the rotor end closures and the inner lining.

The rotors can be made of a heat resistant tempering steel such as having a content of 0.25% C, 1.1% Cr and 0.20% Mo, or 0.15% C, 0.80% Cr, 0.6% Mo and 0.4–1.0% Mn, at least as regards the body portions thereof. The inner lining and its extension providing the working medium outlet as well as the parts of the rotor end closing members can be made of a steel having a content of 0.09% C and 14% Cr. The two inner funnels of the working medium inlet can be made of an austenitic steel having a content of 0.18% C, 25% Cr and 23% Ni. The portions of the casing structure forming the outer housing can consist of common iron plate as also the outermost of the working medium inlet funnels. The lining supporting fins of the outer housing can consist of ordinary low carbon steel or common iron plates and the low pressure end front wall can also consist of low carbon steel.

In the cooling system provided for the rotary device the flow of cooling medium is divided into a number of paths generally parallel with each other as mentioned above, and further generally parallel with the flow of the working medium. Thus the temperature differences between the high and the low temperature ends of the rotary device are equalized in the most appropriate manner. The rotor bodies and the inlet of the working medium are so designed and adapted with one another that every surface unit of the rotors that is brought into contact with the supplied working medium of admission temperature during at least a part of every revolution also is brought into contact with expanding or expanded working medium. Thus every part of the working surfaces of the rotors adopts a temperature considerably below the admission temperature of the working medium without any cooling-away of the supplied high temperature energy by the working surfaces. The cooling channels in the lobes and grooves of the rotors are located closely adjacent to the surfaces thereof to provide a uniform cooling of the entire working surface so that a higher admission temperature is usable simultaneously with a cooling-away of only the smallest possible amount of the high temperature energy.

Figure 16:
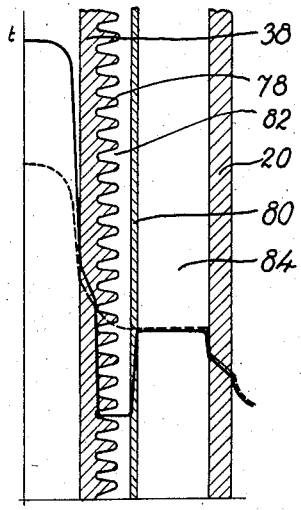
Fig. 16 illustrates diagrammatically the temperature drop through the inner lining and the outer housing walls.

In the temperature diagram of Fig. 16 the curve in full lines represents the temperature drop through the casing structure at a place quite close to the inlet of the working medium. The temperature of the working medium in the working chambers which are beginning to be developed is, for instance, 2200° F. and the temperature of the surface of the inner lining facing the rotors is, for instance, 925° F. The temperature drop in the lining is about 150° F. The temperature of the cooling medium encircling the inner cooling space subsections close to the lining is about 375° F. at the places where the cooling medium enters said space subsections and which places are close to the working medium inlet portion. The temperature of the cooling medium in the outer cooling space subsections is about 675° F. and the outer wall temperature of the casing structure is about 475° F.

The working medium leaves at a temperature of about 1475° F. By the dashed line curve the temperature changes at a portion of the casing structure adjacent the working medium outlet are represented. The surface of the inner lining reaches a temperature of about 875° F. and the temperature of the cooling medium in the inner cooling space subsections close to the lining has here so increased from the temperature 375° F. mentioned above that the temperatures of the two surfaces of the partition wall between the cooling space subsections are practically the same or 675° F. which is the temperature of the cooling medium in the outer space subsections. The cooling medium has in other words, substantially the same temperature in all the outer space subsections. From the foregoing it is also evident that the parts of the casing structure at the hottest end thereof are cooled by means of the coolest cooling medium and the parts at the coolest end thereof by means of the hottest cooling medium, all in order to obtain a most uniform temperature distribution all over the casing structure. The various temperatures indicated above are, of course, only given as examples and can vary more or less from construction to construction and further according to different operating conditions.

The invention is not restricted to rotary devices having only two rotors and the invention is also applicable to such devices operating with more than a single stage of expansion or compression.

What is claimed is:

1. A rotary expander for a high pressure and high temperature working fluid comprising a casing structure and rotors mounted therein, said casing structure having a number of bores corresponding to the number of rotors, said casing structure comprising a separate inner lining and a separate outer housing supporting said lining, the inner lining comprising intersecting barrel portions enveloping the corresponding rotors and being provided with spaced external, annularly disposed projection fins and the outer housing being provided with corresponding spaced internal, annularly disposed projection fins, the internal fins of the outer housing abutting against the inner lining, said inner lining fins and said outer housing fins being provided with axially disposed inter-engaging means permitting the inner lining and the outer housing to key with each other while maintaining relative dilatation therebetween and partition walls being provided to divide the inter-space between the inner lining and the outer housing into inner and outer space sections for a flow therethrough of a cooling medium in parallel with the flow of the working fluid through the expander.

2. A casing structure as claimed in claim 1, in which the inner lining is provided with external annularly disposed projection fins keying with the internal annularly disposed fins of the outer housing.

3. A casing structure as defined in claim 2 in which the inner lining projection fins are each provided with an axially extending annular tongue portion and the outer housing projection fins are each provided with annular grooves whereby said tongue portions are received in said grooves to key said inner lining and outer housing together and permit axial expansion of said inner lining relative to said outer housing.

4. A casing structure as claimed in claim 1, in which a partition wall is provided above the cooling projections of the inner lining to divide the space sections between the inner lining and the outer housing into inner and outer space subsections.

5. A casing structure as claimed in claim 4 having an inlet and an outlet for a cooling medium so provided that the cooling medium enters a top portion of the inner space subsections and discharges from a top portion of the outer space subsections after having swept over the partition wall on both sides thereof successively.

6. A casing structure as claimed in claim 4, in which the partition wall of the cooling space sections is located in immediate proximity to the ends of the cooling projections of the inner lining so that the free gap between said wall and said ends is minute in comparison with the height of the cooling projections in order to increase the speed of the cooling medium flow and to counteract creation of insulating boundary layers on the surface of the cooling projections.

7. A casing structure as claimed in claim 1, for a rotary device operating as an expander of a high pressure and high temperature working medium, having a male and a female rotor, an inlet for the working medium at a top portion of the casing structure and an outlet for said working medium at a bottom portion of said structure, characterized in that the barrel portions of the inner lining enveloping the rotors pass over at the working medium outlet into a radially extending tubular duct for the working medium and that the outer housing generally follows the shape of the inner lining.

8. A casing structure as claimed in claim 7, in which the inner lining is fastened to the outer housing by means of transition members, said transition members at least at the low pressure end of the casing structure being of sufficiently flexible diaphragm character to permit relative expansion between the inner lining and the outer housing.

9. A casing structure as claimed in claim 7, having a generally radially extending inlet funnel for the working medium discharging in an opening of the inner lining at one end of the rotors and surrounded by an enclosing extension of the outer housing forming an inlet for a cooling medium to be introduced into the space between the inner lining and the outer housing.

10. A casing structure as claimed in claim 9, in which the inlet funnel comprises at least two walls placed within and expansibly relative each other and forming a passage for flow of a cooling medium therebetween.

11. A casing structure as claimed in claim 7, in which a partition wall divides the space sections between the inner lining and the outer housing around the rotors and around the outlet of the working medium into inner and outer space subsections for flow of a cooling medium, said inner and outer cooling space subsections communicating with each other at the end of the outlet of the working medium, cooling medium inlet means communicating with the inner space subsections at top parts thereof and cooling medium outlet means communicating with the outer space subsections at top parts thereof.

12. A casing structure as claimed in claim 11, in which the outer casing provides a cooling space surrounding the rotor shafts at the inlet end of the rotors, said shaft cooling space communicating with the cooling medium inlet means at a top portion of said shaft cooling space and with the cooling space surrounding the working medium outlet at a bottom portion of said shaft cooling space.

13. A casing structure as claimed in claim 7, having rotors, comprising body and shaft portions, and front walls facing the ends of the body portions of the rotors and comprising intersecting ring portions surrounding the shaft portions of the rotors to close the adjacent ends of the grooves of the rotors, the front wall at the working medium inlet end of the rotors having a recessed portion providing an axial inlet groove for the working medium between the inlet funnel and the adjacent portion of the rotor ends.

14. A casing structure as claimed in claim 13, in which the front wall at the working medium outlet end of the rotors has a recessed portion providing an axial outlet groove for the working medium.

15. A casing structure as claimed in claim 13, in which the front walls are each provided with an internal space for a cooling medium.

16. A casing structure as claimed in claim 15, in which the surfaces of the front walls facing the internal cooling space are at least in part provided with cooling fins.

17. A casing structure as claimed in claim 15, in which the cooling space in the front wall at the inlet end of the rotors communicates at top and at bottom portions thereof with the cooling space surrounding the rotor shafts at the inlet end.

18. A casing structure as claimed in claim 15, in which the cooling space in the front wall at the outlet end of the rotors at a top portion thereof communicates with the cooling space between the inner lining and the outer casing and at a bottom portion thereof is provided with outlet means.

19. A rotary device with a casing structure as claimed in claim 1, having rotor bodies provided with internal channels for flow of a cooling medium therethrough and in which a shaft portion of the rotors is provided with inlet means for the cooling medium to the channels in respective rotor body, said shaft portion being provided with vane means.

20. A rotary device as claimed in claim 19, in which the cooling medium is admitted to the vane means of the shaft via a guide blading.

21. A rotary device with a casing structure as claimed in claim 1, carried by means of brackets provided on the casing structure in a plane adjacent the horizontal plane through the rotor axes.

22. A rotary device with a casing structure as claimed in claim 1, having rotors with different numbers of lobes, in which the outlet for the working medium is inclined toward the rotor having the higher number of lobes.

References Cited in the file of this patent

UNITED STATES PATENTS

| | | |
|---|---|---|
| 1,177,162 | Zona | Mar. 28, 1916 |
| 1,344,331 | Carrey | June 22, 1920 |
| 1,816,819 | Austin | Aug. 4, 1931 |
| 1,938,566 | Birkigt | Dec. 12, 1933 |
| 2,627,161 | Lindhagen et al. | Feb. 3, 1953 |

FOREIGN PATENTS

| | | |
|---|---|---|
| 759,403 | France | Nov. 16, 1933 |